Oct. 25, 1938.  H. HARVEY  2,134,186
TYING MACHINE
Filed April 27, 1936  12 Sheets-Sheet 1

Inventor
Herbert Harvey
By Lyon+Lyon
Attorneys

Oct. 25, 1938.  H. HARVEY  2,134,186
TYING MACHINE
Filed April 27, 1936  12 Sheets-Sheet 2
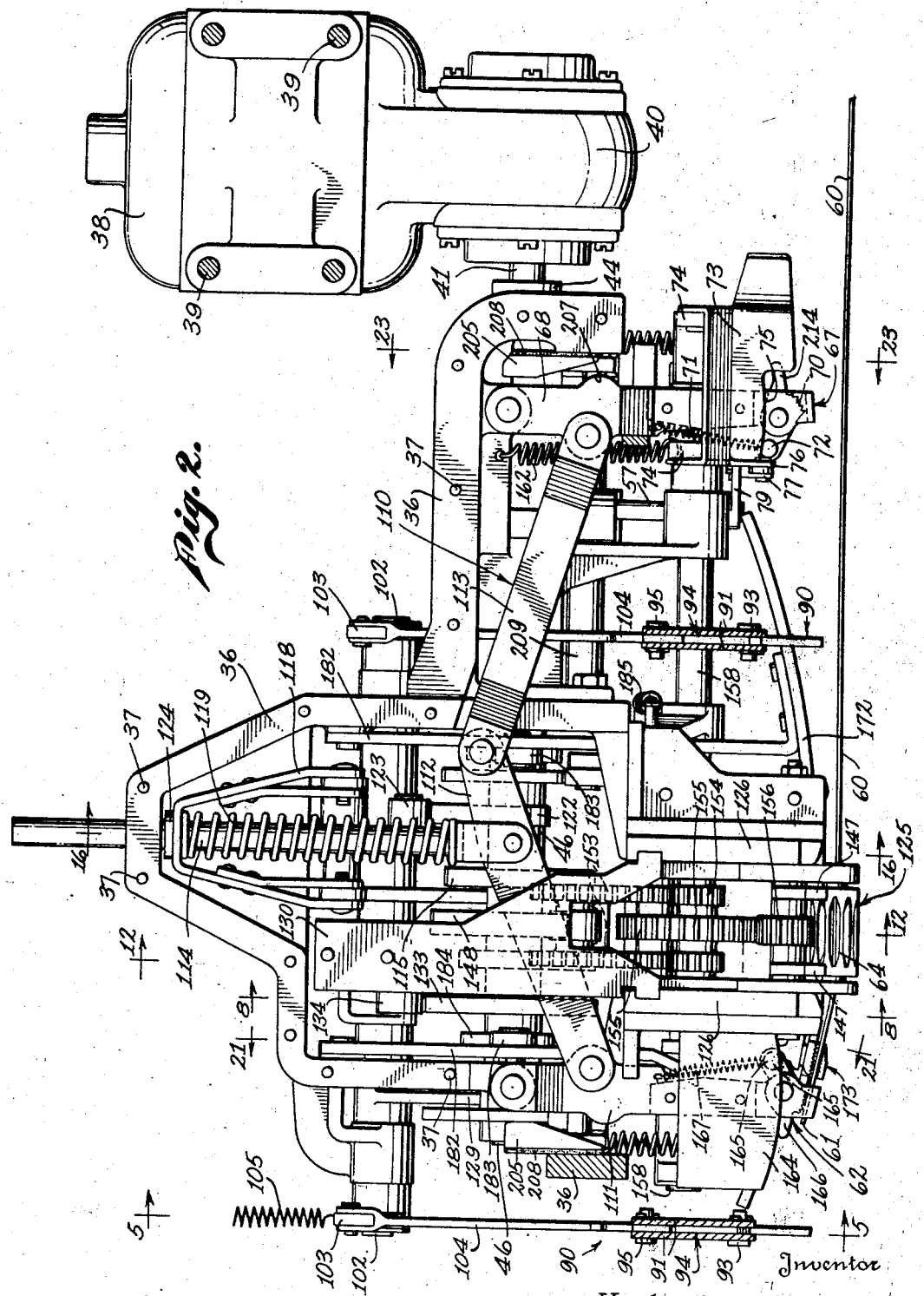
Inventor
Herbert Harvey
By Lyon & Lyon
Attorneys Oct. 25, 1938.  H. HARVEY  2,134,186
TYING MACHINE
Filed April 27, 1936   12 Sheets-Sheet 3
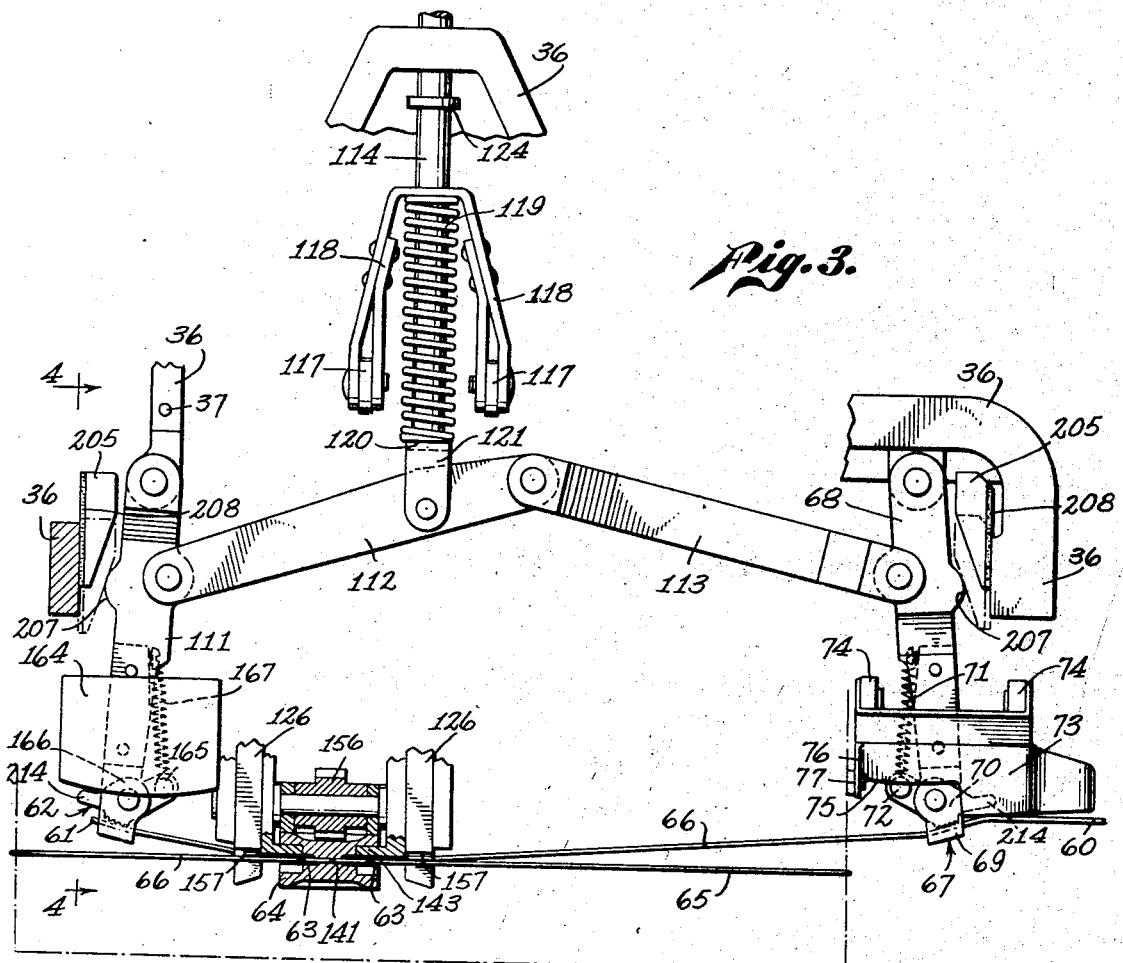
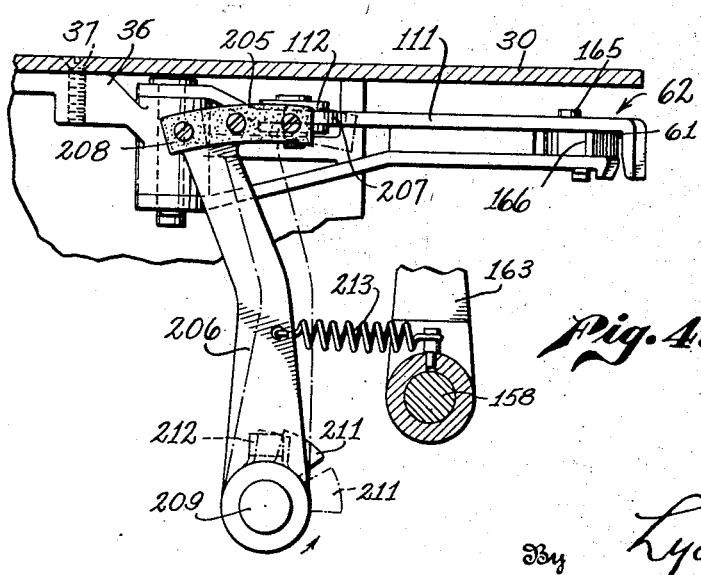
Inventor
Herbert Harvey
By Lyon & Lyon
Attorneys Oct. 25, 1938.　　　　H. HARVEY　　　　2,134,186
TYING MACHINE
Filed April 27, 1936　　　12 Sheets-Sheet 7
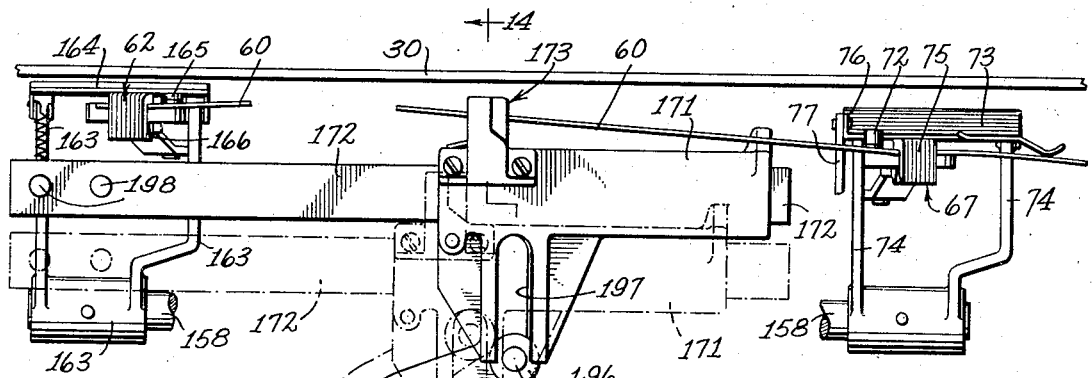
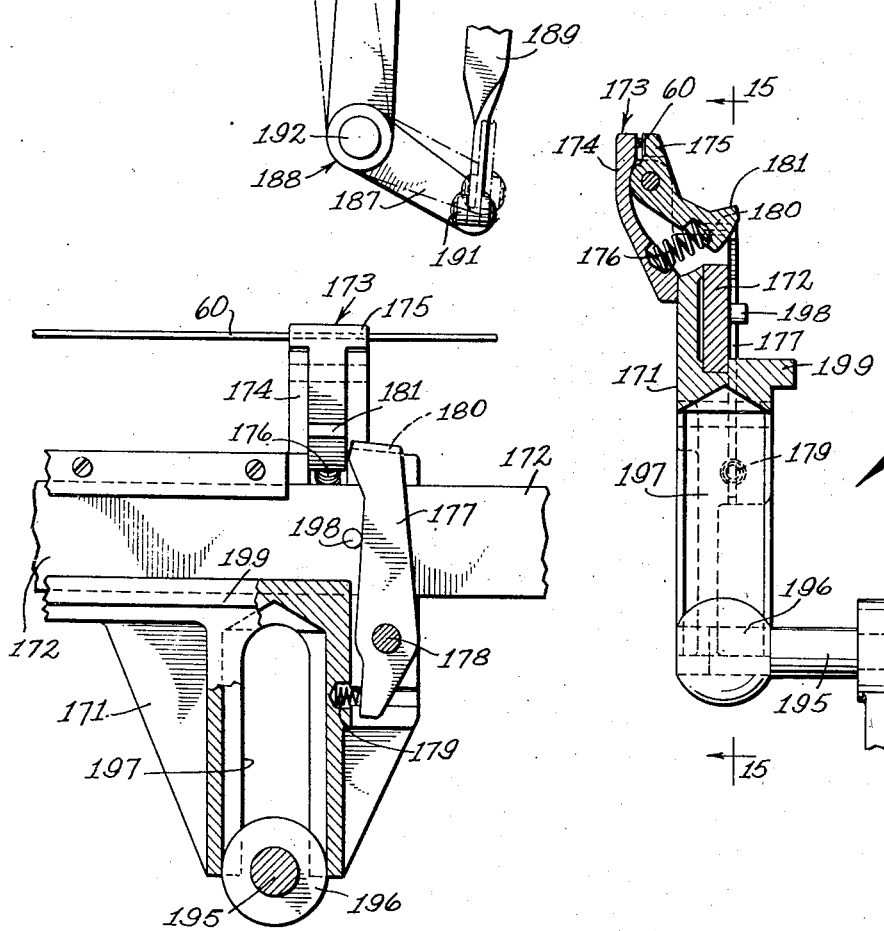
Inventor
Herbert Harvey
By Lyon & Lyon
Attorneys

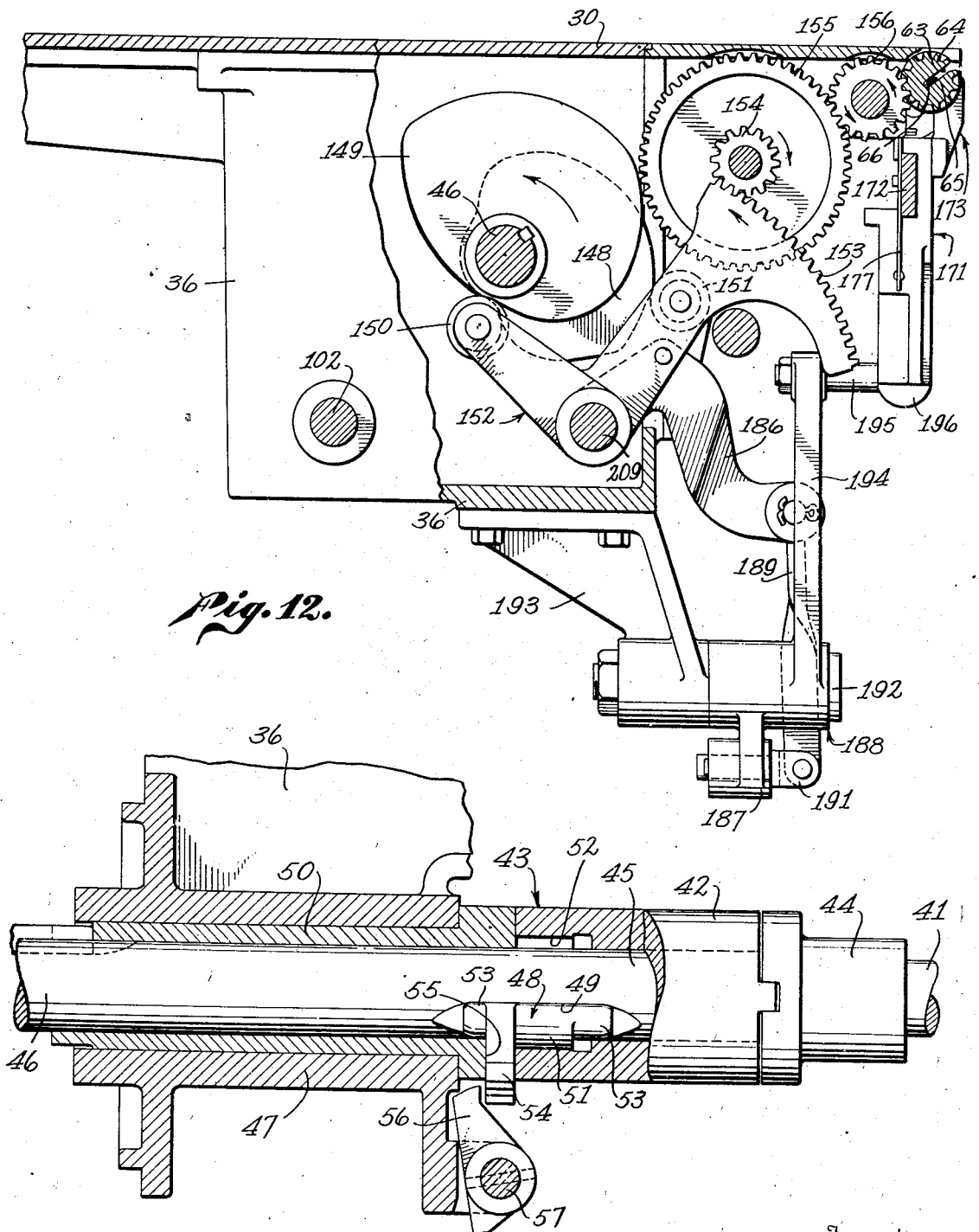

Oct. 25, 1938.  H. HARVEY  2,134,186
TYING MACHINE
Filed April 27, 1936  12 Sheets-Sheet 5

Inventor
Herbert Harvey
By Lyon & Lyon
Attorneys

Oct. 25, 1938.    H. HARVEY    2,134,186
TYING MACHINE
Filed April 27, 1936    12 Sheets-Sheet 4

Inventor
Herbert Harvey
By Lyon & Lyon
Attorneys

Oct. 25, 1938.　　　　H. HARVEY　　　　2,134,186
TYING MACHINE
Filed April 27, 1936　　　12 Sheets-Sheet 8

Inventor
Herbert Harvey
By Lyon & Lyon
Attorneys

Oct. 25, 1938.    H. HARVEY    2,134,186
TYING MACHINE
Filed April 27, 1936    12 Sheets-Sheet 9

Inventor
Herbert Harvey
By Lyon+Lyon
Attorneys

Inventor
Herbert Harvey
By Lyon+Lyon
Attorneys

Oct. 25, 1938.                H. HARVEY                2,134,186
                              TYING MACHINE
                     Filed April 27, 1936      12 Sheets-Sheet 11

Inventor
Herbert Harvey
By Lyon+Lyon
Attorneys

Oct. 25, 1938.   H. HARVEY   2,134,186
TYING MACHINE
Filed April 27, 1936   12 Sheets-Sheet 12

Inventor
Herbert Harvey

By Lyon&Lyon
Attorneys

Patented Oct. 25, 1938

2,134,186

UNITED STATES PATENT OFFICE 2,134,186

TYING MACHINE

Herbert Harvey, Los Angeles, Calif., assignor, by mesne assignments, to The Gerrard Company, Incorporated, Chicago, Ill., a corporation of Delaware Application April 27, 1936, Serial No. 76,581

12 Claims. (Cl. 140—93)

This invention relates to a tying machine of the type illustrated in my copending application Serial No. 688,925, filed September 11, 1933, having issued June 2, 1936, as Patent No. 2,042,843, and especially to certain new and improved features for such machine.

It is one of the principal objects of this invention to provide my earlier machine with an automatic threading device. The purpose of this device is to take control of the supply wire end when cut from a completed tie and to thread it into the first gripper in preparation for the next tying operation. The automatic threading device relieves the attendant of the labor necessary for manually threading the machine after each tying operation, thus permitting an easier and more rapid operation of the machine.

A further object is to arrange the threading device to complete its threading operation just prior to the stopping of the machine, whereby the machine will be automatically rendered ready for the next tying operation.

A further object is to provide the machine with a pair of wire gripping means cooperatively related to the threading device in such manner that upon completon of a tie the threading device will take hold of the supply end of the binding wire at about the same time the cutter acts to cut the wire from the tie and just prior to the release of the wire by one of the gripper means, the other of said gripping means being actuated to receive and grip the end of the supply wire presented thereto by the threading device, whereupon the device actuates to release the wire.

A further object is to provide snubbing means for preventing the jaws of the gripping means, which are carried by the wire tensioning mechanism, from jumping apart under the influence of the tensioning spring when the tie wire is cut at the completion of the tying operation.

A further object is to arrange the snubbing means to hold the gripping jaws in any adjusted position whereby the cut end of the supply wire gripped in one of the jaws will be maintained in position to be engaged and gripped by the shuttle of the threading device and will act to prevent this cut end of the wire from being jerked away from or out of the gripping jaw of the threading device shuttle.

A further object is to improve and simplify the wire spreading, cutting and ejecting means of my previously mentioned machine.

A further object is to provide a wire clamping means for predetermining the minimum slope of the wire from the wire tying pinion to the adjusted surface of the article being bound whereby the held and article encircling portions of the tie wire will be sufficiently separated to insure entry of the wire spreading means therebetween.

Other objects and advantages of the invention will become apparent as the nature of the same is more fully understood from the following description and accompanying drawings wherein is set forth what is now considered to be a preferred embodiment. It should be understood, however, that this particular embodiment of the invention is chosen principally for the purpose of exemplification and that variations therefrom in details of construction or arrangement of parts may accordingly be effected and yet remain within the spirit and scope of the invention as the same is set forth in the appended claims.

In the drawings:

Figure 1 illustrates a front elevational view of the machine, from which the front apron plate has been removed to more fully show the operative parts. In this view the machine is shown just prior to the twisting operation. The tie wire has been placed and tensioned, the wire spreading and cutting means and the wire angling clamps are in their operative positions, and the threading device has been lowered and started on its way to grip the supply wire.

Figure 2 illustrates a top plan view of the machine with the cover plate removed and shows the machine in its rest position.

Figure 3 illustrates a fragmental view of the tensioning and snubbing means and the wire twisting pinion in section. The parts are shown in the positions they would assume just prior to the commencement of the twisting operation.

Figure 4 illustrates a sectional view taken substantially in the plane of line 4—4 of Fig. 3.

Figure 12 illustrates a fragmental sectional view taken substantially in the plane of line 12—12 of Fig. 2. The view is taken to show the twister pinion actuating mechanism and also the mechanism for raising and lowering the slide means of the threading device.

Figure 13 illustrates a fragmental front elevational view of the threading device and shows this device in the act of taking hold of the supply end of the tie wire at about the time it is cut from the completed tie.

Figure 14 illustrates a fragmental sectional view taken substantially in the plane of line 14—14 of Fig. 13 and shows the supply wire clamped in the gripper jaw of the threading device.

Figure 15 illustrates a fragmental sectional view taken substantially in the plane of line 15—15 of Fig. 14 to show the manner in which the gripper of the threading device is released when the gripper has reached the position as shown in Fig. 14.

Figure 25 illustrates a fragmental sectional view, taken substantially in the plane of line 25—25 of Fig. 24, of the driving clutch.

Figure 1:
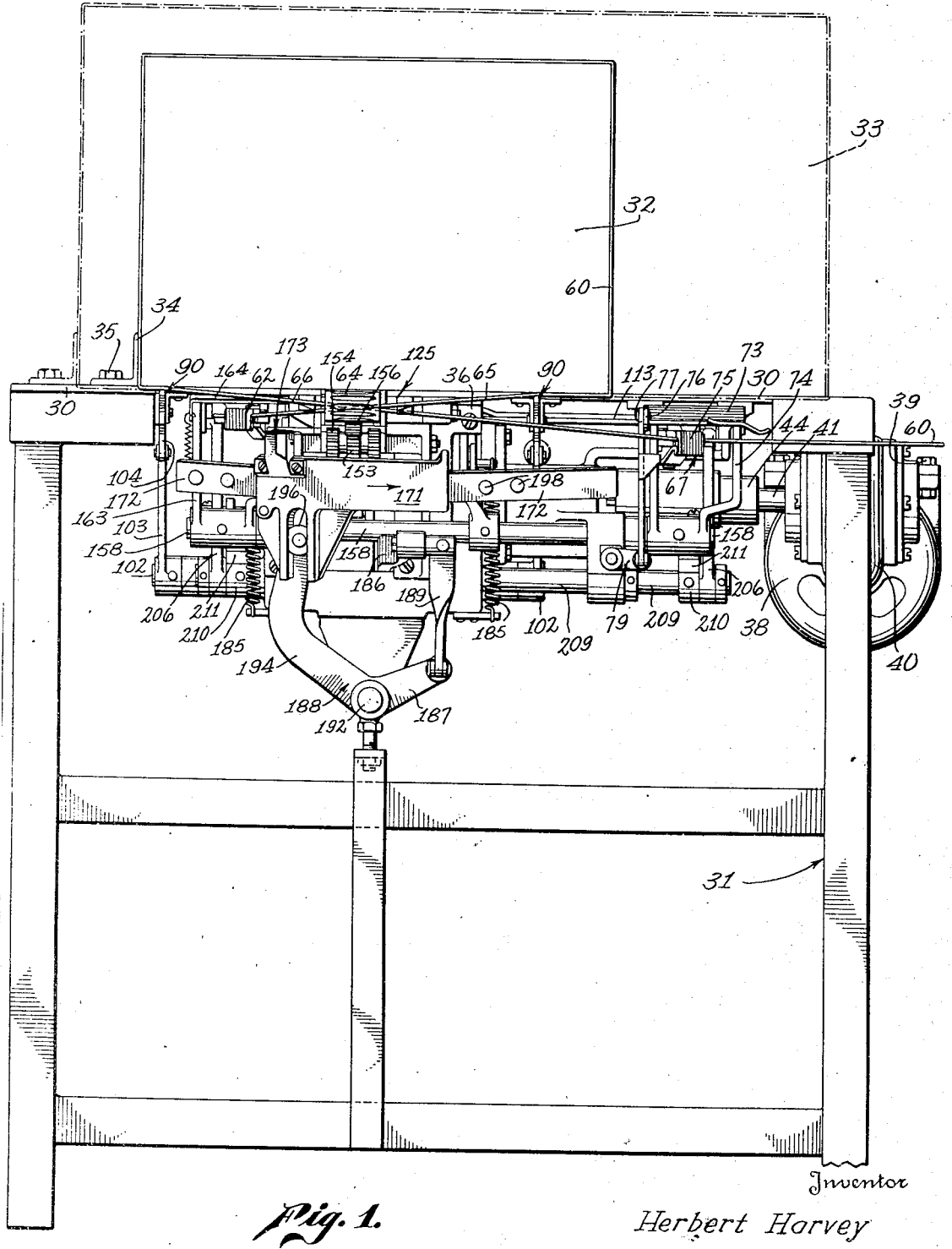

The tying machine of this invention, as illustrated in Figure 1, is preferably mounted upon the under side of a surface plate 30 forming the top of a table structure 31. The surface plate extends a considerable distance to each side and also to the rear of the tying machine proper, in order to support articles of various shape and size. In Figure 1 a relatively small box or carton 32 is shown in full lines as it would be supported during the tying operation while in broken lines a relatively large box or carton 33 is shown. It will be understood that boxes or other articles of a size smaller than box 32 may be readily tied upon the machine and also that articles larger than box 33 may be likewise handled.

For the convenience of locating the articles in proper tying position, the surface plate may be provided with an adjustable fence 34. The fence may be fastened to the plate by cap screws 35 screw threaded into any one of a number of threaded holes (not shown) provided in the plate.

The tying machine proper is a relatively compact self-contained unit including an appropriately shaped cast metal casing 36. The casing is designed to enclose nearly all of the operating elements of the machine and is securely fastened to the underside of the surface plate by countersunk screws 37 (Figs. 2 and 4).

An electric motor 38 is fastened to the underside of the surface plate 30, as by screw means 39. The motor includes a reduction gear 40 having a drive shaft 41 (Figs. 2 and 25) coupled to the driving member 42 of a one revolution clutch 43 (Fig. 25), by coupling 44. The clutch driving member 42 is journaled upon the end 45 of cam shaft 46 which projects through the supporting bearing 47 of the casing 36.

Figure 23:
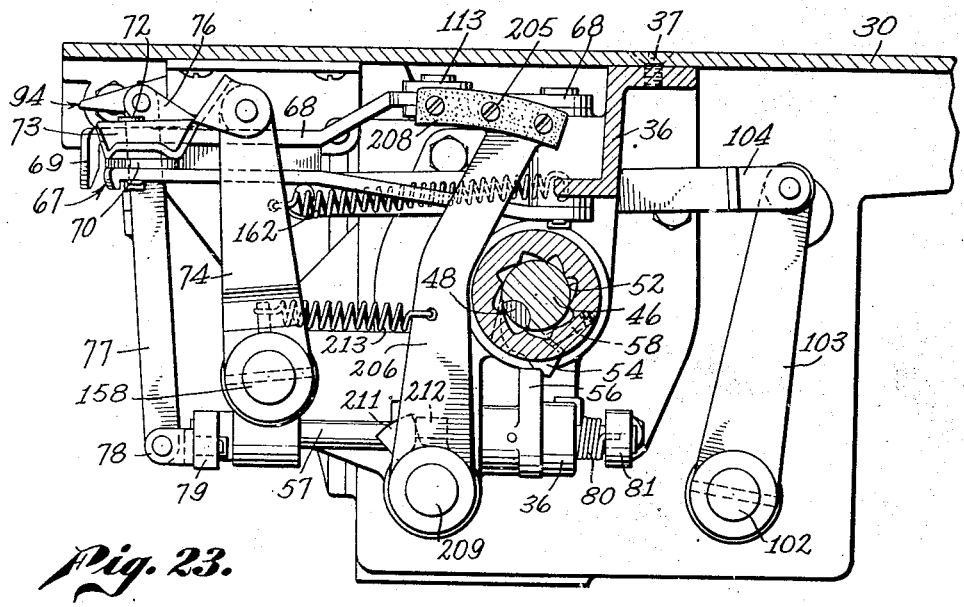
Figure 23 illustrates a fragmental sectional view taken substantially in the plane of line 23—23 of Fig. 2 and shows the machine in rest position and the second gripper in its latched open position.
Figure 24:
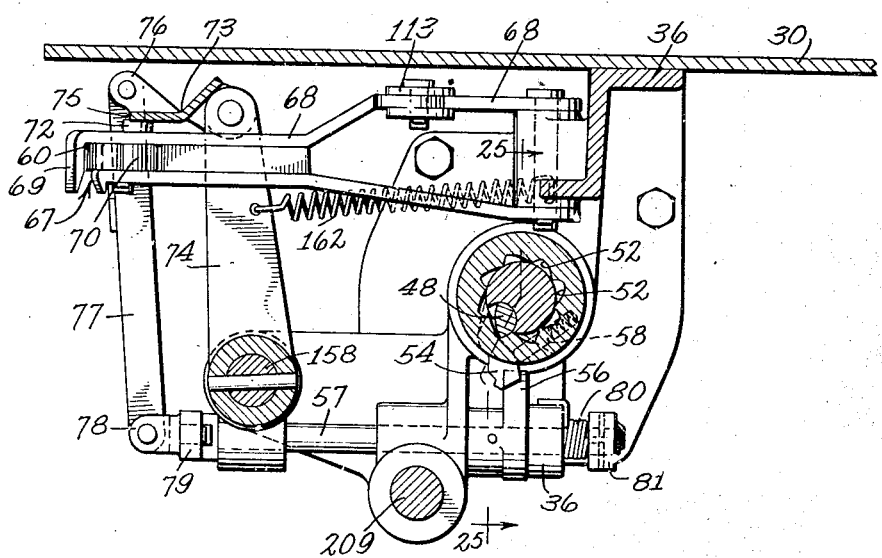
Figure 24 illustrates a view similar to Fig. 23 but differing therefrom by showing the manner and means by which the second gripper and driving clutch are simultaneously rendered active.

There are many different types of one revolution clutches which may be used equally as well as the one shown herein, which in actual practice has proven very satisfactory. The one revolution clutch includes the driving member 42, previously referred to, a driving dog 48 (Figs. 23, 24, 25 and 26) journaled in the short half round groove 49 formed in the cam shaft, and a sleeve member 50. The driving dog 48 is provided with a semicylindrical portion 51 which, when the clutch is released, assumes a position as shown in Figure 23, that is this portion of the dog completely fills shaft groove 49 and its outer surface coincides with the periphery of the shaft, however, the dog may be rotated in its supporting groove to a driving position as shown in Figure 24 whereby one edge of this portion of the dog will swing out beyond the periphery of the shaft and enter one of the notches 52 formed in the inner end of the driving member 42 to thereby positively connect the cam shaft with the driving member, thus establishing a driving connection between the motor and cam shaft.

The end portions 53 of the dog are rounded in such a way as to remain concentric with the periphery of the shaft and act to hold the dog in operative position. As may be observed in Figure 25, these dog ends lie under the shaft bores of the driving member 42 and sleeve 50. At one end of portion 51 the dog is provided with a trip arm 54 (Figs. 23 to 26 inc.) and sleeve 50 is provided with an opening 55 through which the arm projects. During the inactive status of the machine the free end of the trip arm engages a stop finger 56 (Fig. 23) to maintain portion 51 of the dog concentric with the periphery of the shaft, thus interrupting the driving connection between the motor and cam shaft 46. The stop finger is swung out of engagement with the clutch trip arm when the machine is to be placed in operation, by means later to be described. Figure 25 illustrates the stop finger keyed to trip shaft 57 and swung thereby, sufficiently to free the trip arm 54, whereupon under the influence of the spring weighted plunger 58 (Fig. 26) arm 54 will be swung in a clockwise direction thereby turning the dog sufficiently for its portion 51 to engage one of the notches of the driving member, thus placing the machine in operation. During the rotation of cam shaft 46 the stop finger is returned to its initial position and upon completion of a single revolution the trip arm again engages the stop finger and is thereby returned to its inactive position whereby the clutch is disengaged.

The attendant, having placed the box 32 against the aligning fence 34 and in position to receive the tie, takes the supply portion of the tie wire 60 (Fig. 2) and wraps it tightly around the box. The tie wire 60 is supplied from the usual form of reel or coil (not shown). In wrapping the tie wire around the box, it need not be actually pulled tight but only tight enough to take up any unnecessary slack in the wire.

The end 61 of the tie wire will be securely held in the first gripper 62 prior to the wire wrapping operation. The attendant is not called upon to place the end of the tie wire in this gripper as this function is automatically performed by the machine at the completion of the previous tying operation and forms one of the important features of this invention.

In Figure 2 the machine is shown in its rest position and it may be noted in this figure how end 61 of the tie wire is held in the first gripper and the position of the supply portion of the tie wire which is taken hold of by the attendant for the wrapping operation. It should be noted that the tie wire passes through the slot 63 (Figs. 2 and 8) of the twister pinion 64 and from thereon to the supply reel.

Figure 8:
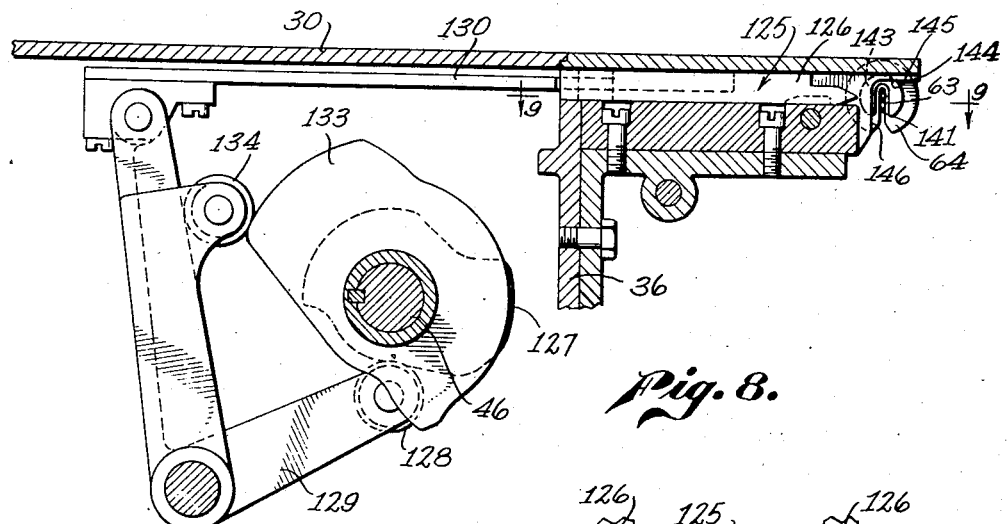
Figure 8 illustrates a fragmental sectional view taken substantially in the plane of line 8—8 of Fig. 2 to show the wire spreading, cutting and ejecting means and driving mechanism therefor and also to show the relation of the wire spreader with relation to the twister pinion.

Attention is also called to Figure 8 which shows slot 63 directed downwardly whereby the first lap 65 and last lap 66 of the tie wire will wrap naturally into the pinion slot, without requiring attention upon the part of the attendant. This feature is fully covered in my referred to copending application and will not be further emphasized herein excepting to direct attention to the fact that this feature greatly aids in the wrapping operation.

The last lap 66 of the tie wire, after being wrapped into the twister pinion slot, is wrapped into the downwardly directed jaws of the second gripper 67 whereupon the gripper is automatically tripped to take a secure hold of the wire. The second gripper is formed upon the free end of the tensioning lever 68 (Fig. 3) and includes one jaw 69 preferably formed integral therewith and a cooperating jaw 70 pivotally mounted upon the lever. A spring 71 (Fig. 3) yieldingly urges the gripper jaw 70 into gripping relation with the stationary jaw 69.

Just prior to the completion of the previous tying operation, this second gripper is automatically latched in its open position in readiness to receive the tie wire upon the completion of the wire wrapping operation and in this way relieves the attendant of the time and effort to tend to this detail.

The second gripper latch means is provided by mounting an upwardly directed stud 72 (Figs. 3, 13, 23 and 24) upon the pivoted gripper jaw 70. This stud may also provide the means of attaching one end of spring 71 to the jaw. Cooperating with stud 72 is an appropriately formed latch plate 73 pivotally coupled to the free end of a resetting lever 74 (Figs. 3, 13, 23 and 24). As may be observed, most clearly in Figures 3 and 13, the lever is of the bifurcated type and provides spaced bearings to which the latch plate is pivotally mounted and in this way provides a very stable mounting for the plate. In Figures 13 and 23, the cam edge 75 of the latch plate is shown engaging stud 72 carried by the pivoted gripper jaw 70 and in this way maintains the jaw in its retracted position. As the attendant places the last lap of the tie wire in this second gripper, the latch plate 73 is raised either by the attendant's hand or by the wire itself. As the latch plate is raised, its cam edge 75 is lifted above the gripper jaw stud, thus releasing the jaw to be swung under the influence of its spring means 71 to close tightly upon the placed tie wire. As is usual in this style of gripper, the pivotal center of jaw 70 is positioned slightly to the tension side of the gripping surfaces of the jaws (Fig. 3) whereby the greater the pull upon the tie wire, the greater will be the gripping action of the jaws.

The lifting of the latch plate to release the gripper jaw 70 is also made use of to swing stop finger 56 sufficiently to release the clutch arm 54 in order to place the clutch 43 in action. For this purpose, the inner side edge of the latch plate is flanged upwardly as at 76 (Figs. 3, 13, 23 and 24) and to the forward edge of this flanged portion is pivotally connected a drag link 77. The other end of the drag link is pivotally connected to clevis 78 (Figs. 1, 23), which in turn is pivotally mounted upon the free end of lever 79 (Figs. 1-23). This lever is keyed upon the forward end of the trip shaft 57 to which shaft, as previously pointed out, the clutch stop finger is keyed. A torsional spring 80 (Fig. 23) is coiled around and acts between the shaft collar 81 and the machine casing 36 to yieldingly urge the shaft to rotate in counter-clockwise direction as viewed in Figure 25. Through the train of mechanism just described, the torsional spring also acts to yeildingly urge the latch plate into latching relation with the gripper stud.

From the above description it will be appreciated that the attendant in wrapping the last lap of the tie wire into the second gripper not only releases the gripper to take hold of the wire but also trips the driving clutch into action, thus placing the machine in operation.

The cam shaft 46 will be driven through one full revolution and during this rotation will actuate through suitable cams the several elements of the machine and at the completion of the single revolution will be brought to rest by the automatic release of the driving clutch. The two first elements to be brought into operation upon the tripping of the clutch are the wire clamping means and the wire tensioning device. The wire clamping means will be described first.

*Wire clamping means 90 (Figs. 1, 2, 5, 6 and 7)*

The purpose of the wire clamping means is to lift the initial and final laps of the tie wire into contact with the bottom side of the box and in this way to separate these laps of the tie wire from the held end and supply portion of the wire whereby the wire separating, cutting and ejector means may invariably enter between them.

This clamping means would not be necessary if relatively narrow boxes are to be tied as then the path followed by the first and final laps from the opposite sides of the twister pinion to the adjacent corners of the box will take a steep enough angle to provide sufficient separation from the portions of the wire leading from the opposite sides of the pinion to the first and second gripping means.

The manner in which the clamping means separates the wire laps is clearly shown in Figure 1. In this figure if the clamping means 90 were not provided and a relatively wide box, such as shown in broken lines, were to be tied, the angle of the first and last laps of the tie wire from the pinion to the corners of the box might not separate sufficiently from the held laps of the wire to insure a positive entry of the wire separating means therebetween.

The location of the clamping means with relation to the twister pinion is preferably as shown but they may be moved a little closer to or further from the pinion, as best suited to the particular design of the machine.

The exact structural detail of the wire clamps is immaterial as long as they act to lift or angle the article encircling laps of the tie wire from the held portions thereof.

Figure 5:
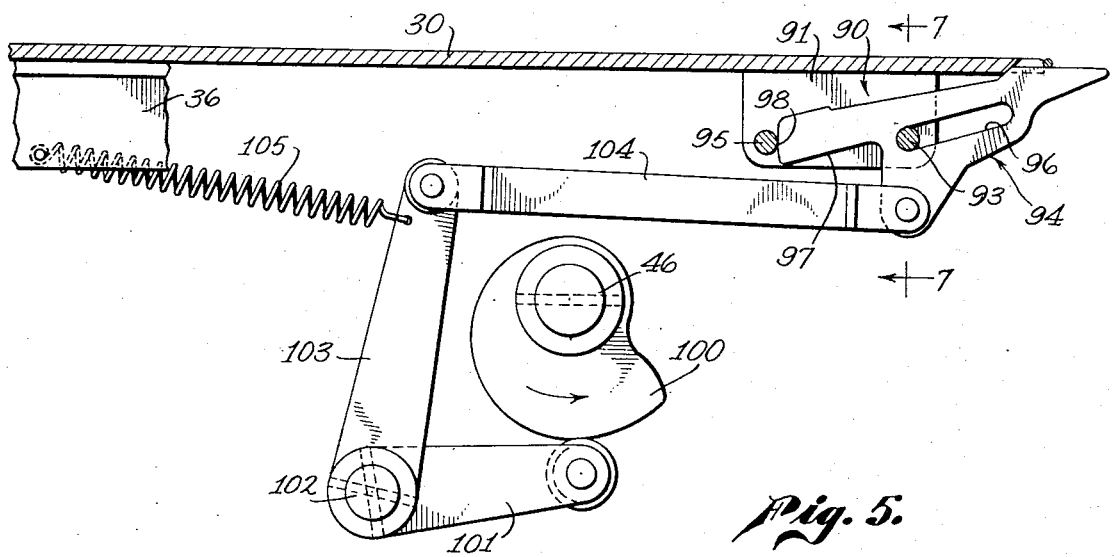
Figure 5 illustrates a fragmental sectional view taken substantially in the plane of line 5—5 of Fig. 2 to show one of the wire clamps and its operating means.
Figure 6:
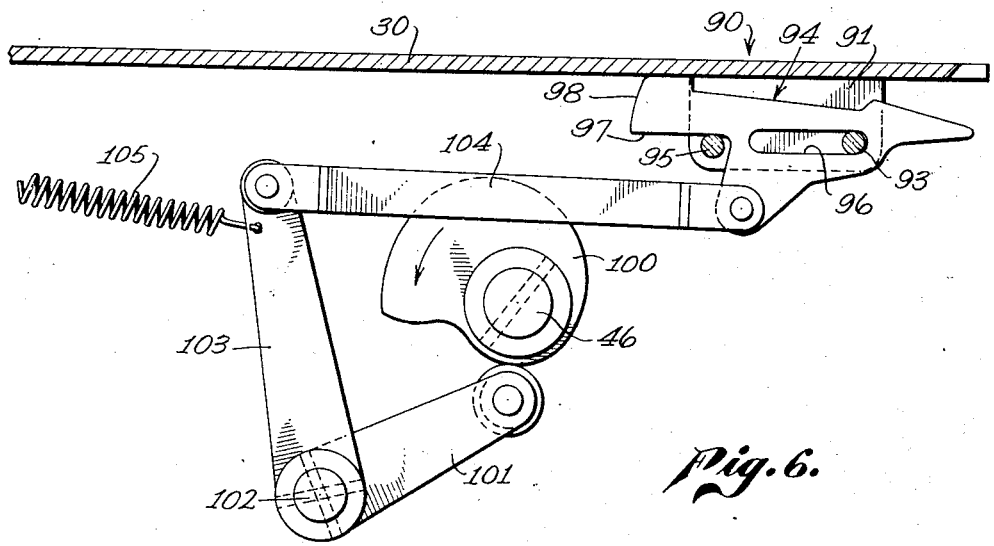
Figure 6 illustrates a view similar to Fig. 5 to show the clamp in its open retracted position.
Figure 7:
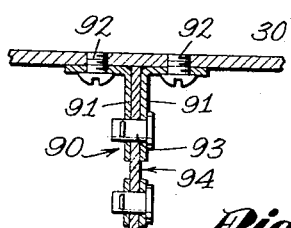
Figure 7 illustrates a sectional view taken substantially in the plane of line 7—7 of Fig. 5.

Referring particularly to Figures 5, 6 and 7, it will be observed that the surface plate 30 upon its under side is provided with a pair of closely opposed bracket plates 91, one set of these plates being provided for each clamp and as the two clamping means are substantially alike the description for one will do for both.

The bracket plates are fastened to the surface plate by suitable screw means 92. Passing transversely through the bracket plates are two pins, the forward pin 93 acting as a bearing for slidingly supporting the clamp jaw 94 while the rear pin 95 acts as a stop for the jaw. The clamping jaw is slidably mounted between the two bracket plates and is provided with a longitudinal slot 96 for slidable support upon pin 93, and with a guide surface 97 arranged to ride upon the surface of pin 95 until the clamp jaw has moved to its outermost position, as shown in Figure 5, wherein it will be noted that the arcuate rear end 98 of the clamp jaw will have cammed down onto pin 95. By a comparison of Figures 5 and 6, the action of the clamping jaws may be fully understood. Figure 6 illustrates the jaw in its normal retracted position while Figure 5 shows the jaw in its extended clamping position. The jaw in moving from retracted to the clamping position first moves almost directly forward until the end of slot 96 engages pin 93 and at about this time the guide surface passes pin 95. This movement is important as it enables the jaw to move out under the tie wire before moving upwardly. Next the jaw will pivot about pin 93 while its end 98 will swing down in front of pin 95. Thus, the front end of the jaw will lift the engaged tie wire into engagement with the undersurface of the box. In some cases the jaw may be arranged to lift the tie wire only sufficiently to insure the separator invariably passing between the two adjacent tie wires.

The clamping jaw is actuated by a clamping cam 100 securely keyed upon cam shaft 46. A cam follower lever 101 is securely fastened at one end upon cross shaft 102 and its free end is provided with a cam roller arranged to cooperate with the clamping cam. Upon opposite ends of cross shaft 102 are secured crank arms 103, one for each wire clamping means, and connected to their related jaws 94 by links 104. A spring 105 is provided for yieldingly retaining the jaws in their retracted positions.

*Tensioning means 110*

The tensioning means is substantially like this same means described in my related application and, therefore, will be but briefly described.

The tensioning means is most clearly shown in Figures 2, 3, 4 and 16, and may include the tensioning lever 68 previously referred to as carrying the second gripper. This lever, at its end opposite to that carrying the second gripper, is pivotally mounted to the machine casing. At the opposite side of the machine casing is pivotally mounted another tensioning lever designated 111 which carries at its free end the first gripper 62 which is of substantially the same construction as the second gripper.

These two tension levers 68 and 111 are connected by a pair of interconnected toggle links 112 and 113 (Fig. 3) and to link 112 is pivotally connected one end of the actuating plunger 114, while the opposite end of plunger 114 is slidably mounted in the rear end of casing 36. By actuating plunger 114 forwardly (Fig. 3), the toggle link will tend to assume a more nearly straight line position, thereby causing the free ends of the tension levers to swing away from each other and thereby placing a tension in the tie wire encircling the box.

Figure 16:
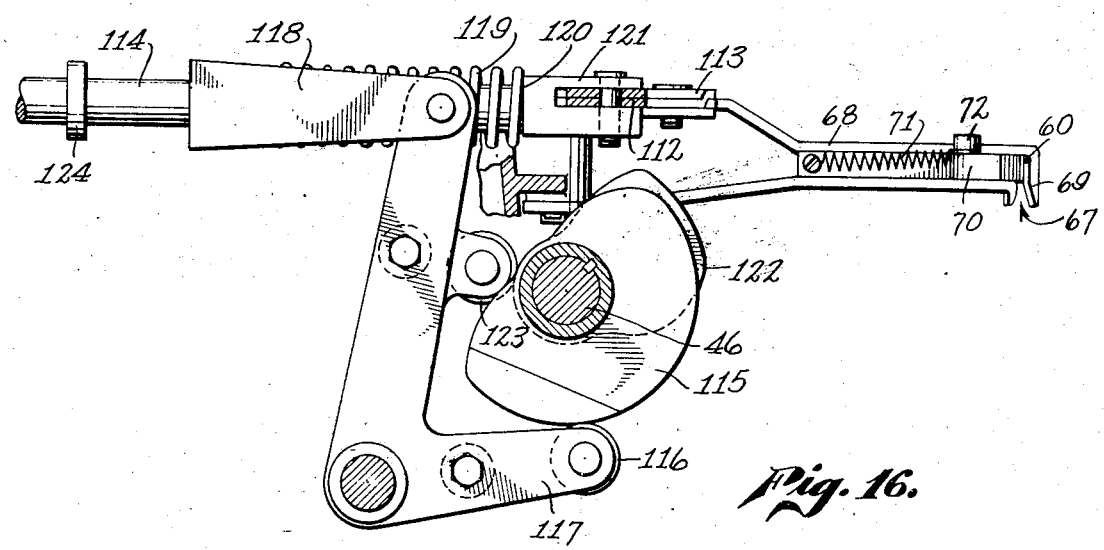
Figure 16 illustrates a fragmental sectional view taken substantially in the plane of line 16—16 of Fig. 2 to show the actuating mechanism for the wire tensioning means.

The tensioning means is brought into action at the proper time in the operating cycle of the machine by a tensioning cam 115 (Fig. 16) securely fastened upon cam shaft 46, and cooperating with the cam roller 116 carried by the bell crank lever 117 to cause this bell crank lever to rotate in a clockwise direction as viewed in Figure 16. This figure shows the bell crank lever rotated to its tensioning position. The movement of the free arm of the tensioning lever is transmitted to plunger 114 of the tensioning means proper by the yoke 118. It is preferable to form the bell crank lever of a bifurcated structure in order to transmit the tensioning effort without causing a bending moment in the related parts, and in this way the ends of yoke 118 may be pivotally connected to the upper ends of the bell crank lever (Fig. 3).

The intermediate portion of yoke 118 is formed and arranged to slidably fit upon plunger 114. A tension spring 119 acts between yoke 118 and the shoulder 120 formed at the intersection of the plunger with its clevised end 121 (Figs. 3 and 16). Figure 2 illustrates the tensioning means in its rest or retracted position, while Figures 3 and 16 show it in its extended tension applying position. A comparison of these figures clearly shows the manner of operation of this mechanism.

Means are provided for positively returning the tensioning means to its rest position, which means may include the return cam 122 (Fig. 16) cooperating with cam roller 123 carried between the upper arms of bell crank lever 117 to rotate the bell crank lever in a counter-clockwise direction, as viewed in Figure 16. The return movement of the bell crank lever will in turn slide yoke 118 rearwardly on plunger 114 until it engages the plunger collar 124 whereupon the tensioning means proper will be returned to its rest position. The return action of the tensioning means takes place just prior to the end of the operating cycle of the machine.

Figure 17:
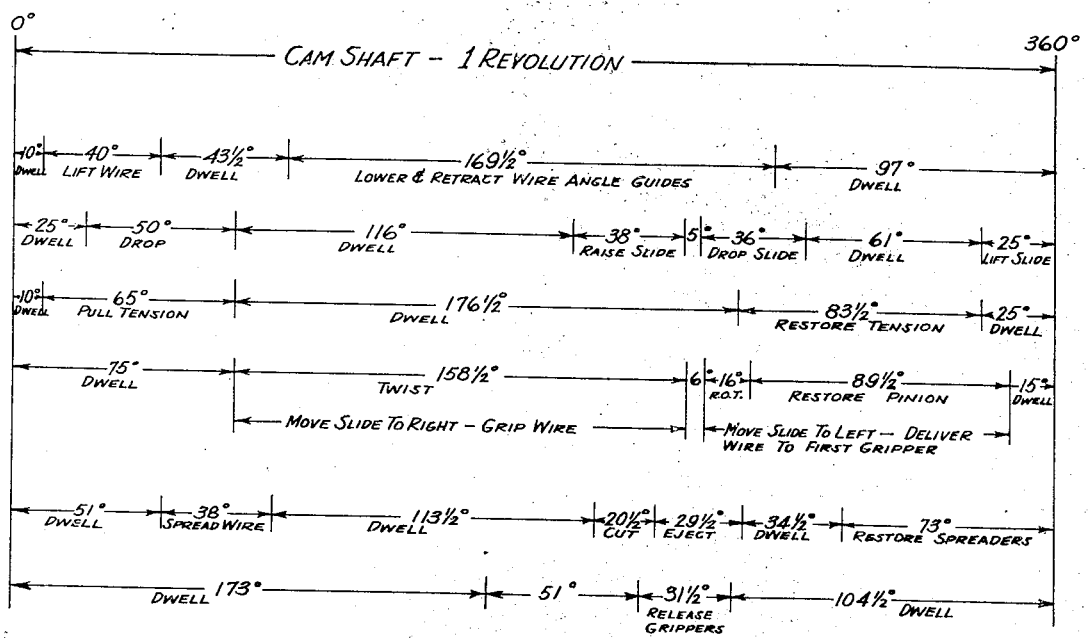
Figure 17 illustrates a timing chart for the different cams included in the machine.

A cam chart for each of the driving cams is shown in Figure 17 from which the time of operation of each or all of the actuating elements of the machine may be easily obtained.

Just prior to the completion of the wire tensioning operation, the wire spreaders 125 (Figs. 2, 8, 9, 10, 11 and 22) are projected into their wire spreading position.

*Wire spreading means*

The wire spreading means also acts to cut the surplus material from the tie and finally to eject the completed tie from slot 63 of the twister pinion. The action of the spreading means for severing the surplus wire from the tie and for ejecting the completed tie will be described in the proper order in which these functions take place during the operating cycle of the machine.

Figure 9:
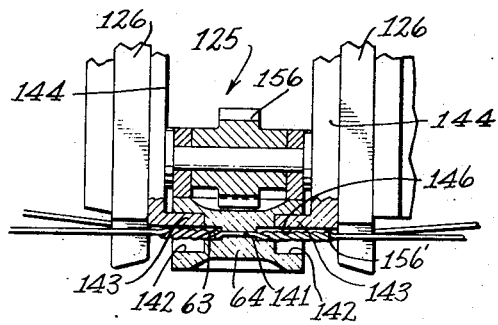
Figure 9 illustrates a fragmental sectional view taken substantially in the plane of line 9—9 of Fig. 8. The wire spreaders have not been shown in section in order to more clearly show the manner in which these elements act to control the length of twist during the tying operation.
Figure 22:
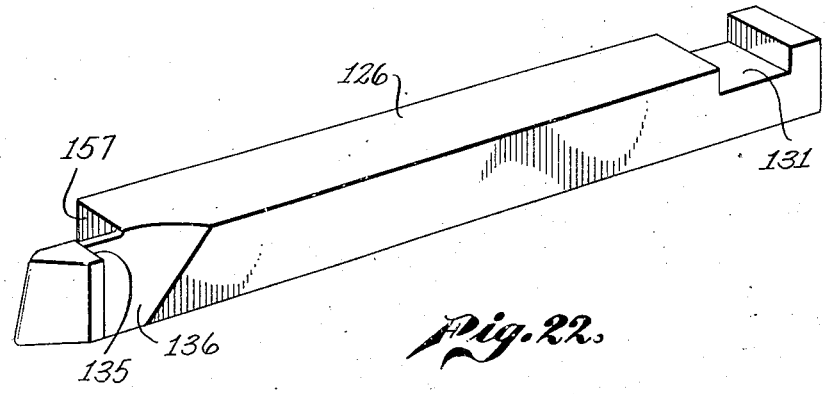
Figure 22 illustrates, on enlarged scale, a perspective view of one of the tie wire spreading, cutting and ejecting elements.

The wire spreading means includes a pair of spreader blades 126. Figure 22 illustrates in perspective one of these blades. In Figures 2, 8 to 11, the spreader blades are shown slidably mounted at opposite sides of the twister pinion 64 and in their retracted position, as shown in Figure 8, do not intersect the plane in which the tie wire is wrapped when being placed about the article being tied. After the clamping means has separated the article encircling laps of the tie wire from the held laps and shortly after the tensioning means has started upon its operation, the spreader blades are projected forwardly to a position as shown in Figure 9 and held in this position until near the completion of the tying operation.

As may be observed in Figure 8, the front end of each spreader blade is pointed and the point lies in a plane just below the article encircling lap of the tie wire so that it may nicely enter between the article encircling laps and held ends of the wire as shown in Figure 3.

The entrance of the spreaders between the strands of the tie wire is aided by the action of the wire clamping means, previously referred to, which acts to lift the article encircling laps into engagement with the box or article being tied, whereby the wires are sufficiently separated to insure the spreaders entering between the different laps of wire.

The function of the spreaders is to limit the length of twist formed in the tie wires in the manner shown in Figure 9 and thereby insuring a tight, compact and secure tie.

Figure 11:
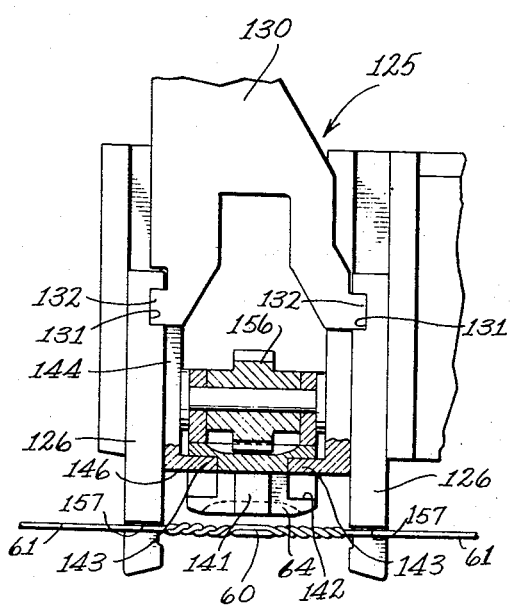
Figure 11 illustrates a view similar to Figs. 9 and 10 with the exception that the spreaders have been advanced to eject the completed tie from the twister pinion.
Figure 10:
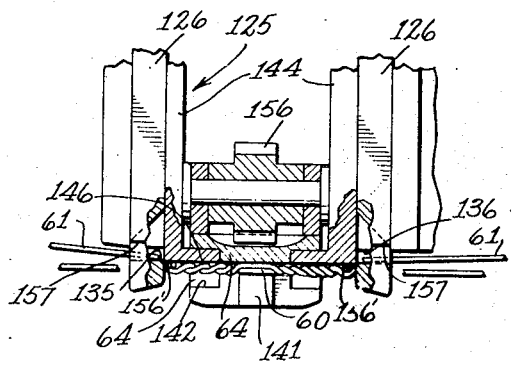
Figure 10 illustrates a view similar to Fig. 9. In this view the spreaders are partially shown in section to depict how they are actuated for the cutting of the surplus material from the completed tie.

The operating mechanism for the spreaders preferably includes a spreader cam 127 keyed to cam shaft 46 and arranged to cooperate with cam roller 128 carried by one arm of the bell crank lever 129. The other arm of bell crank lever 129 is operatively connected to the rear end of crosshead 130 (Fig. 8) to which each of the spreader blades 126 are attached. In Figure 11 a simple and effective means is shown for connecting the spreader blades to the crosshead and includes notching the spreader blades as at 131 and providing the crosshead with registering tongues 132. The operating mechanism also includes a positive return means for the spreader blades which may include a return cam 133, also keyed upon cam shaft 46, and a cooperating cam roller 134 carried by the upper arm of the bell crank lever 129. All forward or right hand movements, as shown in Figure 8, of the spreader blades are controlled by cam 127 while all inward or left hand movements of the spreaders are controlled by cam 133. Thus through the two cam driving arrangements all movements of the spreaders are positively controlled.

It might be well to point out at this time the latching and shearing shoulder 135 (Fig. 22) formed on each spreader blade by notching out the blade just rearwardly of its pointed front end, as at 136. As each blade is moved forwardly, it spreads the laps of the tie wire and its forward movement is not brought to a stop until the shoulder 135 passes the held lap and, due to the tension now placed in the tie wire, this lap will snap into notch 136, thus in effect being now latched in position and cannot be moved out of position prior to or during the rotation of the twister pinion 64 in forming the tie. Shortly before the completion of the tie forming operation, these shoulders 135 act in cooperation with stationary shearing edges to sever the held ends of the tie wire close to the ends of the tie, in a manner later to be more fully described.

*Wire tying means 140*

Although a preferred form of the wire tying means is shown, it is to be understood that any other means may be made use of which will securely join the end 61 and portion 66 of the placed tie wire.

The principal element of the forming means shown is the previously referred to slotted twister pinion 64. This pinion is provided with the usual slot 63 having a throat 141 (Figs. 3, 9 to 11) of slightly greater width than the diameter of the tie wire.

Each end of the pinion is counterbored as at 142 to receive the inwardly directed internal sectoral bearings 143 (Figs. 8 to 11) carried by members 144. Referring especially to Figure 8, it may be noted that the forward lower portion of each member 144 is cut sufficiently so as to uncover the twister slot 63 when directed downwardly in its wire receiving position and to leave the slot uncovered in its horizontal discharge position. The cut out portion of these members 144 is bounded by edges 145 and 146 and the internal sectoral bearings 143 are also cut out in the plane of these edges, thus rendering substantially the entire quarter portion of the twister pinion fully exposed. The pinion is also supported at each end by the external sectoral bearings 147. These bearings only engage the rear peripheral portion of the twister pinion and, therefore, do not interfere with the loading or discharging of the pinion. Figure 2 shows the extent to which these bearings support the upper rear portion of the pinion and they extend to about the same point on the underside of the pinion. Between the internal and external sectoral bearings the pinion is securely journaled in the machine although a relatively great portion of the pinion extends outwardly or overhangs these bearings.

The normal or rest position of the twister pinion is shown in Figure 8 wherein it may be noted the wire receiving slot is directed downwardly enabling the attendant to easily wrap the tie wire therein, while at the completion of the tie forming operation the slot is directed more or less horizontally in order to permit the spreader blades to eject the completed tie.

The driving means for the twister pinion may include drive cam 148 (Fig. 12) and return cam 149, both securely fastened upon cam shaft 46. These two cams cooperate with cam rollers 150 and 151 carried by opposite arms of the bell crank lever 152. The upper arm of bell crank lever 152 is provided with a gear segment 153 meshing with pinion 154. It is preferable but not necessary to arrange the bell crank in pairs (Fig. 2) and to thereby provide a pair of said gear segments 153 and also a pair of pinions 154 cooperating therewith.

In Figure 2 this relation of the segments and pinions is clearly shown and also the positioning of the drive gear 155 between the pinions. This drive gear and the pinions may be formed integral or made up of separate parts assembled together to in effect form a single unit. The driving force is transmitted from gear 155 to the twister pinion through an idler gear 156.

The pitch of cam 148 will swing bell crank lever sufficiently to cause the twister pinion to be rotated, through the gear train, a sufficient number of revolutions to form a secure tie, and will come to rest only after the slot of the twister pinion has swung a short distance above the horizontal (Fig. 12) to provide what is commonly called over-twist.

As a result of this over-twist, when the twister slot is returned, by the action of cam 149, to its horizontal discharge position, substantially all torsional strain of the tie against the sides of the twister slot will be relieved and as a result the tie can be easily ejected from the twister. After the finished tie has been ejected, the return cam again functions and this time to return the twister pinion to its rest position of Figure 8.

At about the same time the tie is finished, the spreader blades 126 are moved rearwardly sufficiently to cause edges 135 (Figs. 10-22) to shear the held ends of the tie wire from the tie by moving these edges past their cooperating shearing edges 156' (Fig. 10) and in this way severing the surplus material of held end 61 and the supply portion of the tie wire from the finished tie. With the cutting of the tie free and the return of the twister slot to its discharge position, the spreader blades 126 are again moved outwardly until the ejector shoulder 157 (Figs. 11 and 22) of each blade engages the tie and pushes it clear of the twister pinion slot. As the pinion is now cleared and the work of the spreaders has been completed, these elements are returned to their rest positions.

The end of the supply portion of the tie wire when cut from the tie is not permitted to fall out of or leave the machine. Instead, it is held by the second gripper until the threading device takes control of the wire and threads it into the first gripper in preparation for the next operating cycle of the machine. Before describing the threading device, the means for automatically returning the first and second grippers to their open positions will be described.

Figure 26:
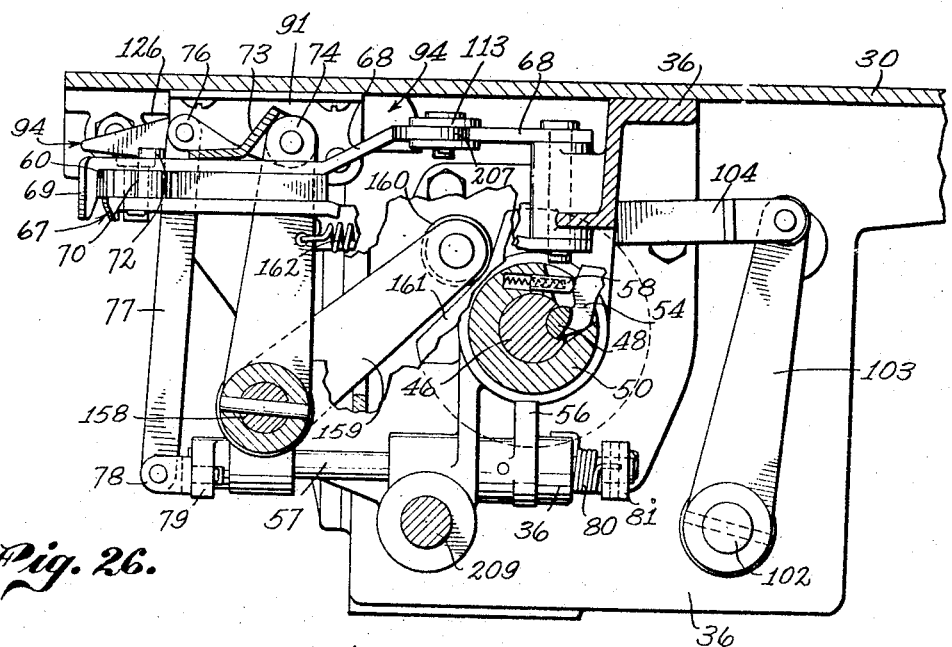
Figure 26 illustrates a view similar to Figs. 23 and 24 but showing the machine at a different position in its operating cycle. This view illustrates the means for actuating the second gripper to its open position.

Referring to Figures 23, 24 and 26, the resetting lever 74 is securely keyed to cross shaft 158 journaled in the machine casing and carrying a cam lever 159 (Fig. 26) supporting at its free end cam roller 160, which roller cooperates with resetting cam 161 (Fig. 26). The cam roller is yieldingly maintained in contact with cam 161 by spring 162 (Figs. 23 and 24) acting between lever 74 and casing 36. Figures 23 and 24 show the gripper resetting mechanism in its rest position, while Figure 26 illustrates this means in its retracted position. The rearward movement of the free end of resetting lever 74 from Figures 24 to 26 carries the second gripper latch plate 73 back far enough to insure its dropping down off of the gripper latch stud 72, whereby when the resetting lever 74 is returned to its rest position of Figure 23 the cam edge of latch plate 73 will engage stud 72 and will thereby swing the gripper jaw 70 to its open position, releasing the supply wire. It will be understood that before the actual release of the second gripper is accomplished, the threading device will have taken hold of the supply wire.

As soon as latch plate 73 is drawn off of the top of gripper stud 72, it swings downwardly until its forward edge engages the top surface of the tensioning lever 68. This downward swing of latch plate 73 is in response to the action of torsion spring 80 of the clutch tripping mechanism and returns the stop finger 56 to its clutch releasing position, thereby bringing about the stopping of the machine at the completion of the tying cycle.

To reset or open the first gripper upon completion of the tie, cross shaft 158 is provided adjacent the first gripper with a resetting lever 163 (Figs. 2, 13, 18 and 19) and like lever 74 the free end of lever 163 carries the first gripper latch plate 164, which cooperates with stud 165 of the pivoted first gripper jaw 166, and this structure acts in the same manner for opening the first gripper as does the corresponding structure for the second gripper.

The first gripper remains latched open until the threading device presents the supply wire end thereto. The threading device in presenting the tie wire to the first gripper lifts latch plate 163 to release stud 165, thus releasing the gripper jaw 166 to swing under the influence of its spring means 167 into its wire gripping position.

*Threading device 170*

The threading device takes control of the supply wire when cut free from the tie and upon release of the wire by the second gripper conveys it to and threads it into the first gripper.

The threading device may include a carriage 171 (Figs. 1, 13 and 18) slidably mounted upon guide-rail 172, which is preferably but not necessarily arcuate in form, as viewed in Figure 2. The carriage is provided with a gripper 173 (Figs. 13 to 15) including a relatively stationary jaw 174 and a pivoted jaw 175 serrated if desired, as shown in Figures 1 and 14. A spring 176 acts between these two jaws to yieldingly urge the pivoted jaw into gripping relation with the stationary jaw. Normally the pivoted gripper jaw 175 is latched open (Figs. 19 and 20) by latch means 177 pivotally mounted upon carriage 171 as by pivot pin 178 and yieldingly urged into latching relation with jaw 175 by spring 179 (Fig. 15). The upper end of the latch is flanged over as at 180 (Figs. 14, 15 and 19) to overlie the boot shaped portion 181 (Fig. 14) formed upon the lower end of gripper jaw 175, thus securely locking the gripper jaw in its open position when the latch flange overlies the boot shaped portion. This is the condition of the gripper in its rest position.

In Figure 2 the machine is shown in its rest position and herein the carriage 171 may be observed adjacent the first gripper after having delivered the end of the supply wire thereto just prior to the completion of the previous operating cycle of the machine and has released the supply wire.

Figure 18:
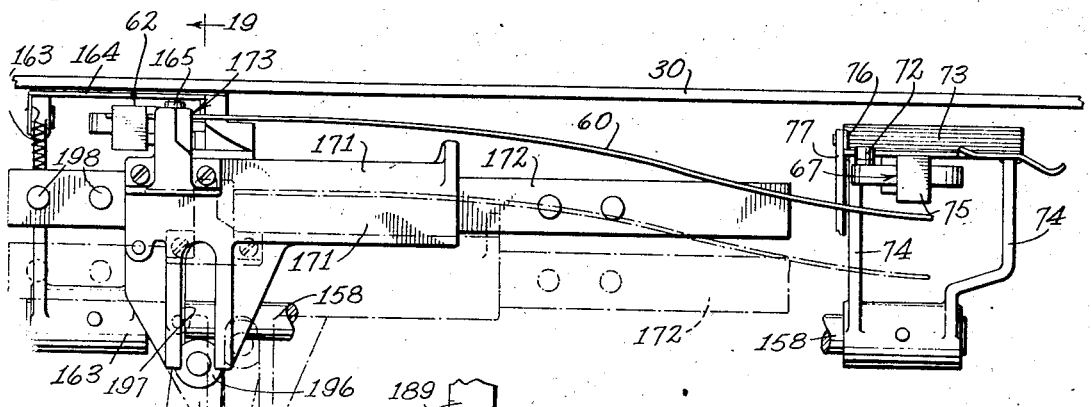
Figure 18 illustrates the same view of the threading device as does Fig. 13 but in this view the device has moved to deliver the end of the supply to the first gripper.
Figures 19, 20:
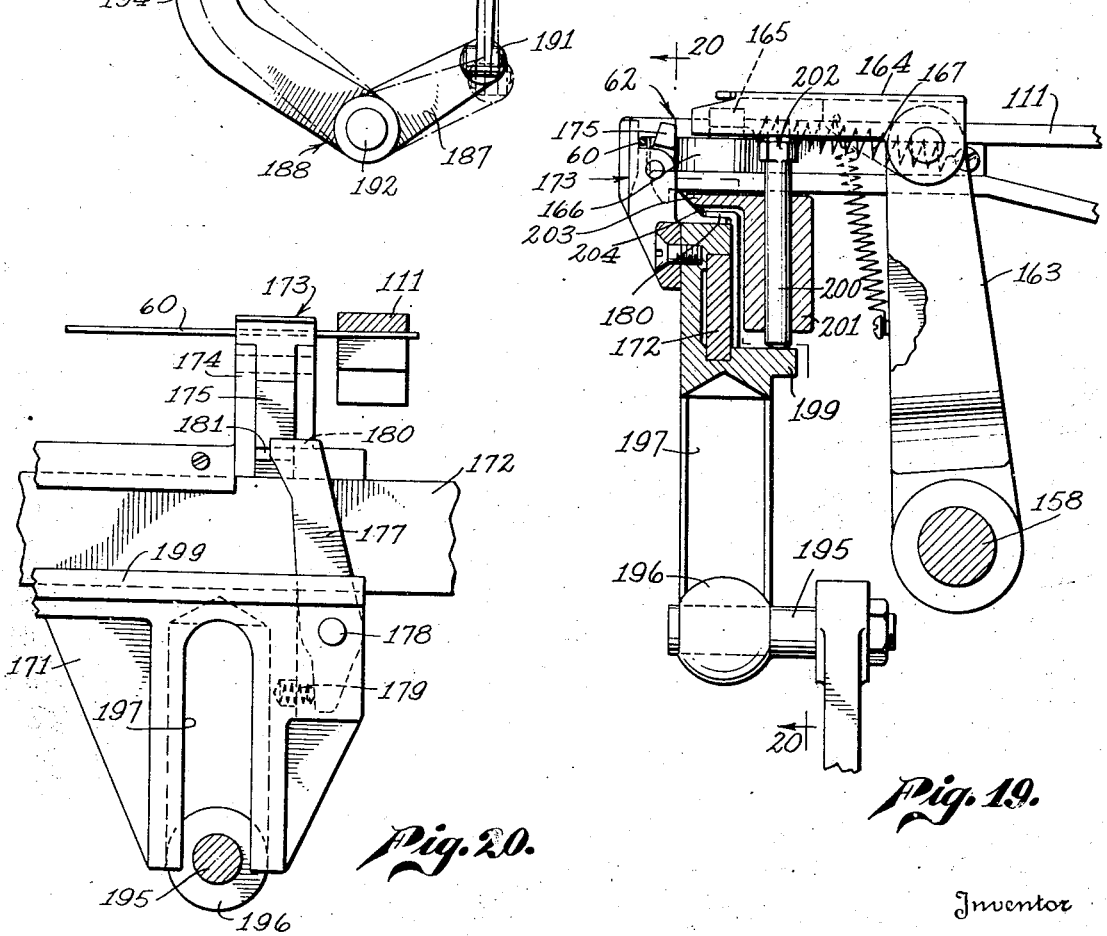
Figure 19 illustrates a fragmental sectional view taken substantially in the plane of line 19—19 of Fig. 18 to show the manner in which the gripper jaw of the threading device is opened at the time the first gripper takes hold of the wire.
Figure 20 illustrates a fragmental sectional view taken substantially in the plane of line 20—20 of Fig. 19 to illustrate the action of the threading device gripping jaw latch for releasably retaining the jaw open.
Figure 21:
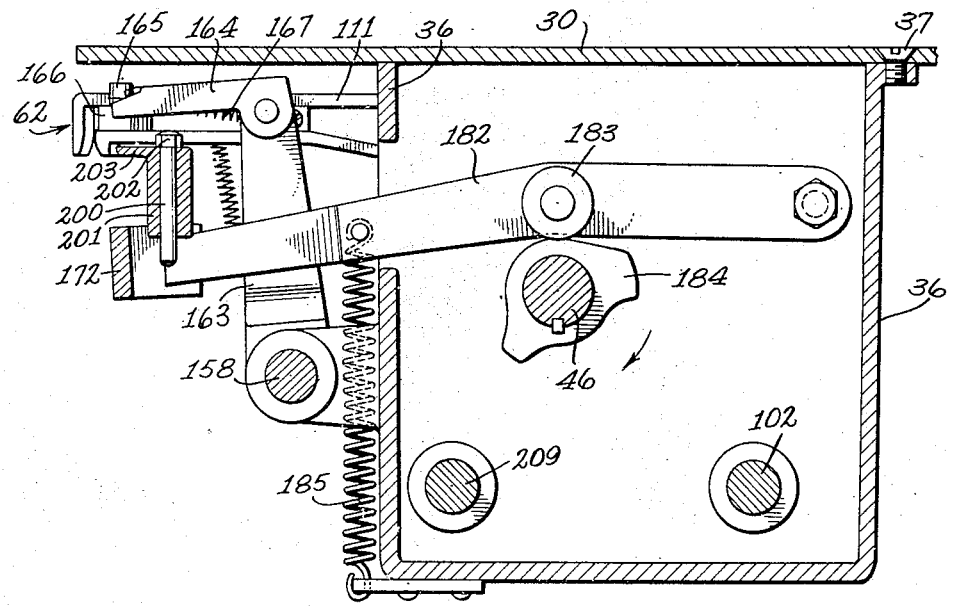
Figure 21 illustrates a fragmental sectional view taken substantially in the plane of line 21—21 of Fig. 2 to show the actuating means for raising and lowering the threading device.

Figure 18 also illustrates the threading device in its rest position in full lines and in broken lines the manner in which the guiderail 172 is lowered during the initial portion of the operating cycle of the machine. For this purpose the guiderail is carried upon the free end of lever arms 182 (Fig. 21), which arms at their opposite ends are pivotally connected to the casing 36 (Fig. 2) and each arm intermediate its ends is provided with a cam roller 183 cooperating with lift cams 184 securely keyed upon the cam shaft 46 (Fig. 21). The lift cams are shaped to raise the guiderail while at each end of the carriage travel and to maintain the rail in its lowermost position during the medial portion of its travel. This permits the carriage and its gripper to be lowered sufficiently to pass freely under the twister pinion and other parts of the machine during its travel from one end to the other. Springs 185 (Figs. 1 and 21) are provided to yieldingly urge the cam rollers 183 into operative relation with their related cams.

Any suitable means may be provided to drive the carriage along the guiderail from its rest position shown in Figures 2 and 21 to its wire receiving position as illustrated in Figure 13. I find it preferable to make use of the motion derived from cams 148 and 149 which operates the wire twister pinion and for this purpose I arrange the crank arm 186 (Figs. 1 and 12) to be driven from the bell crank lever 152. The free end of crank arm 186 is connected to arm 187 of bell crank lever 188 by the twisted link 189 (Figs. 1, 12 and 18). Link 189 is not directly pivoted to arms 186 and 187 but instead is pivoted to the clevis member 190, which in turn is pivotally carried by arm 186 and in the same way the lower end of the link is pivoted to the clevis member 191 pivotally carried by arm 187 and in this way providing for such universal motion between these parts as may be necessary. The bell crank lever 188 is journaled upon stub shaft 192 carried by the casing bracket 193. The long upwardly directed arm 194 (Figs. 1, 12, 18) of bell crank lever 188 at its free end carries an outwardly projecting stub shaft 195 (Figs. 12, 14 and 15) upon the outer end of which is journaled a nearly spherical roller 196. The carriage 171 is provided with a guideway 197 (Figs. 1, 15) having a circular cross section of such proportions as to nicely fit over the spherical roller 196, and by this means the swing of arm 194 will cause the carriage to travel from one end of its stroke to the opposite and due to the guideway 197 the carriage may be raised or lowered without interfering with the carriage advancing means.

From the cam chart of Figure 17 it may be noted that guiderail 172 is dropped or lowered before carriage 171 is started upon its journey along the rail, however, these functions may overlap somewhat without difficulty, but after the carriage gripper 173 has cleared the twister pinion it rises as it proceeds to its wire receiving position of Figure 13 so that upon reaching this position it will be fully raised. As the carriage rises and moves into its receiving position, the jaws of the carriage gripper receive between them the supply portion of the tie wire and just as the carriage reaches the end of its movement in this direction the gripper latch 177 engages stop pin 198 (Fig. 15) projecting inwardly from the guiderail, swinging the latch sufficiently to release the gripper jaw 175 and as a result the supply wire will be securely gripped in the carriage gripper. It is at about this same time that the cutter means acts to shear the supply wire from the completed tie. It is preferable to time the machine so that the threading device will take hold of the wire before the cutting action is completed and also prior to the release of the second gripper, as otherwise the supply wire might move or be moved from such position as to be received by the carriage gripper. The first and second grippers are opened at the same time so that the first gripper is opened ready to receive the supply wire end before the threading device starts upon its return stroke. As soon as the first gripper is opened the remnant cut end of the tie wire drops out of the gripper. This occurs naturally as the gripper jaws point downwardly, as previously explained. Figure 13 illustrates the threading device taking hold of the tie wire just prior to its being cut from the tie and also shows the first and second grippers still holding their respective portions of the wire. Shortly following the opening of the grippers, the carriage will be lowered and the return journey started. Figure 18 shows the carriage as having just arrived at the end of the return stroke and delivering or threading the end of the tie wire to the first gripper. Figure 13, for sake of clearness, has left the tying, and spreading means out but indicates the length of wire end which will project from the first gripper side of the carriage gripper when the cutting operation has been performed and, thus, provides the necessary length of wire to be threaded into the first gripper. As the carriage is raised at the first gripper, it acts to automatically trip the gripper as soon as the wire end has been delivered thereto. For this purpose the carriage is provided with an inwardly directed shoulder 199 (Fig. 19) which engages the lower end of trip rod 200 slidably mounted in casing bearing 201 and lifts this rod until its head 202 contacts with and thereby lifts the first gripper latch plate 164 to free stud 165 of the pivoted jaw 166. As soon as latch plate 164 releases stud 165, the pivoted jaw 166 is swung under the influence of its spring means 167 into gripping relation with the presented supply wire end. Thus, the supply portion of the tie wire is automatically threaded into the first gripping means.

At about the same time, the first gripper is tripped to grasp the wire or immediately thereafter the carriage gripper is caused to be opened. A simple arrangement is provided for this purpose which includes extending forwardly from bearing 201 a flange 203 (Figs. 19 and 21) arranged to engage the surface 204 (Figs. 14 and 19) of the carriage gripper jaw 175 and to swing this jaw to its open position, whereupon latch 177 is swung under the influence of its spring 176 until its flanged portion 180 overlies the boot shaped portion 181 of the gripper, thereby latching the carriage gripper in its open position and releasing the tie wire. Shortly after the first gripper takes hold of the tie wire, the machine comes to rest and is in readiness for the next tying operation.

It will be understood that as the threading device conveys the supply wire to the first gripper, the body of the wire is played into the twister pinion slot without requiring the attention of the operator for this detail. Figure 2 illustrates the machine in its rest position and how nicely the tie wire 60 is placed for the convenience of the operator for the placing of the next tie wire.

It will be remembered that the tensioning action is transmitted through the tension spring 119 (Figs. 3-16) and, therefore, in case the tensioning levers 68 and 111 did not happen to be swung to the extreme limit of their travel, which would rarely happen in practice, these levers would immediately jump to this position due to the compression of the tension spring 119 as soon as the held ends of the tie wire was cut. If it were not for the threading device, this sudden action would not be serious, however, when the machine is provided with a threading device such action is serious as the sudden jerking outwardly of the tie wire in many cases would pull the supply wire out of the threading device gripper, or even if the wire was not pulled all the way out it might be pulled sufficiently to reduce the projecting end of the wire to such an extent that it could not be grasped by the first gripper when presented thereto.

To overcome this difficulty, I have provided a snubbing or stop means for checking any outward movement of the tensioning levers 68 and 111 when the cutting action takes place. This means may include a wedge shaped stop member 205 (Figs. 2 and 3), carried upon the free end of each stop lever 206 (4 and 23) and acting between the circular boss 207 (2, 3 and 27) formed on the outer edge of tension levers 68 and 111 intermediate the ends thereof and the machine casing 36. The casing engaging surface of each stop member may be lined with leather 208 (Fig. 3) or other suitable material for softening the action of the sudden thrust of the member against the casing when the tensioned wires are cut and also for setting up sufficient friction or braking action to hold these members against being forced backward as a result of this sudden thrust.

Figure 27:
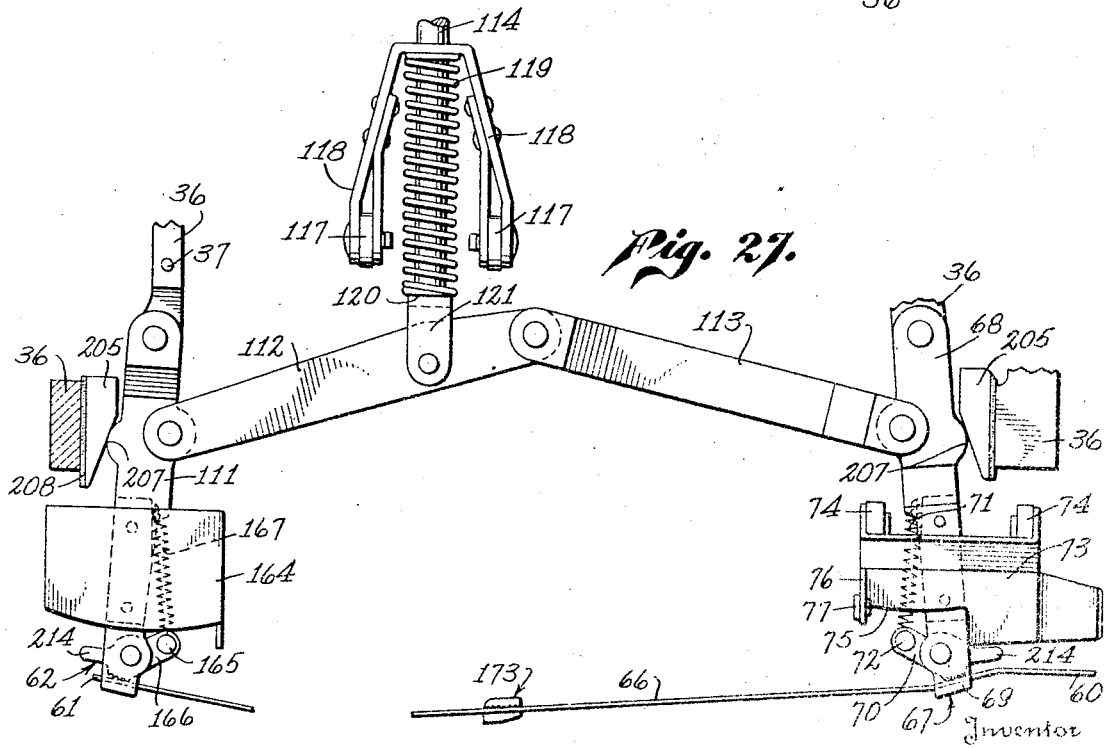
Figure 27 illustrates a view similar to Fig. 3 excepting that the tying means has not been included and showing the machine at a different position in its operating cycle. This view illustrates the snubbers acting to prevent the tensioning means swinging abruptly apart upon the action of the cutters.

The stop means are normally retained in their retracted position, as shown in Figure 2 and in full lines in Figure 3, until after the tensioning means has completed its wire tensioning action and thereafter moved forwardly until the wedge shaped surface of the members engage the tensioning lever bosses 207, as shown in Figure 27, and in this position the stop means remain until after the wire cutting operation has been completed.

The mechanism for actuating said stop means may include journally mounting the lower ends of stop levers upon cross shaft 209 (Figs. 1 and 23). The twister actuating bell crank lever 152 (Fig. 12) is securely fastened upon shaft 209 so that the shaft is rocked during the operation of the tying means. This motion of shaft 209 is made use of for swinging the stop levers to or from their active positions. Referring to Figures 1 and 23, it may be noted that a collar 210 is pinned to the shaft adjacent each of the stop levers and each collar is provided with shoulders 211, against the rear face of which the horizontally projecting finger 212, carried by the stop lever, is yieldingly thrust by the stop lever spring 213 (Fig. 23).

As the tying means is brought into action after the tensioning means has functioned, it follows that the stop means which are actuated from the driving mechanism of the tying means will also be actuated after the tensioning means has acted.

The driving mechanism for the tying means will turn shaft 209 in a clockwise direction, as viewed in Figure 4, during the tying operation and as the collars 210 are carried by the shaft they will rotate therewith. The stop levers 206 will swing with the collars due to the action of springs 213 until the wedge shaped portion of stop members 205 wedge between the machine casing and circular bosses 207 of the tensioning levers, whereupon further movement of the levers will cease, however, collars 210 with their shoulders 211 may continue their rotation until reaching the broken line position of Figure 4 which represents the extent of rotation of shaft 209 by the tying means driving mechanism. With the stop members 205 wedged between the casing and tensioning levers, these levers are stopped against sudden outward movement when the tensioned tie wire ends are cut, and, therefore, the supply portion of the tie wire cannot be jerked from the gripper of the threading device.

On the return stroke of the driving mechanism for the tying means, shaft 209 will be turned backward or in a counter-clockwise direction, as viewed in Figure 4. During the return rotation of shaft 209 the collar shoulders 211 carried thereby will pick up fingers 212 of the stop levers 206 and return them to their rest positions.

It will be understood that each stop lever is free to swing forwardly independently of the other, and the importance of this feature will be appreciated when it is pointed out that the tensioning levers may or may not swing to the same extent while tensioning the tie wire. As for example, one of the tensioning levers may remain stationary while the other is swung through its full travel, during the tensioning operation, in which case the stop lever for the first mentioned tensioning lever will swing through a relatively great distance to wedge the stop member between the casing and circular boss of this tensioning lever while on the other hand as the circular boss of the second tensioning lever will have moved into close proximity, if not in actual contact with the tapered point of the stop member, little or no movement of its related stop lever will take place. In actual practice the stop means has proven to be very effective in its operation.

The attendant in operating the machine of this invention will proceed in substantially the following manner. First the fence 34 will be adjusted to suit the width of articles to be tied, the box or other article will be placed upon plate 30 and against the fence and in position for the tie. The supply wire 60 may now be looped around the article and wrapped into the twister pinion slot and thereafter into the second gripper, whereupon the gripper will take hold of the wire and simultaneously therewith the one revolution clutch will be tripped into operation. The attendant has nothing further to do until the tie is completed, whereupon the article or box may be shifted to place a second tie thereabout, and after the last tie has been completed to remove the article and guide the next one into correct tying position. In most cases the boxes or articles will be fed to the machine by a standard conveyor, not shown, so that the work of the attendant is greatly reduced. When the roll of tie wire becomes exhausted, a new one may be supplied and the initial end manually threaded into the first gripper by lifting the gripper latch plate 164 and swinging the gripper jaw 166 open, to receive the wire end, by means of the thumb piece 214 (Fig. 27) and with the wire end in place permitting the gripper jaw to swing into gripping relation with the wire. In case the latch 164 snaps down in back of stud 165 when the jaw is opened to receive the wire end, it may be manually lifted to free the gripper stud, thus permitting the gripper to take hold of the wire.

In the actual use of the machine of this invention, it has been found to operate very rapidly in forming a tightly tensioned tie about articles, boxes, and other objects, and requires very little effort or attention from the attendant. Once the tie wire has been wrapped around the article and into the second gripper, the machine operates automatically to complete the tying operation without requiring further attention from the operator until the next tie is to be formed.

Having fully described the invention, it is to be understood that it is not to be limited to the details herein set forth, but the invention is of the full scope of the appended claims.

I claim:

1. In a tying machine, a first gripper for gripping the free end of a tie wire, a second gripper spaced from the first gripper and operable for gripping the tie wire after being placed about an object to be tied, severing means positioned between the grippers, a threading device operable upon the completion of the severing operation for presenting the cut end of the wire to the first gripper, means for opening said grippers upon the completion of the severing operation, and means for causing the first gripper to close upon the wire end presented thereto by the threading device.

2. In a wire tying machine, means for gripping the free end of a tie wire, a severing means spaced from said gripper, a threading device arranged to take hold of the supply portion of the tie wire adjacent the severing means and to present the cut end of the wire to the gripper, means for opening the gripper to receive the wire end presented thereto by the threading device, and means actuated by the threading device for causing the gripper to close upon the wire.

3. In a tying machine, a spring weighted tensioning means, stop means for the tensioning means, and means automatically operable upon the completion of the tensioning operation to actuate the said stop means for locking the tensioning means against further tensioning action.

4. In a tying machine, a spring weighted tensioning means for pulling taut a placed tie wire, means for severing the tie wire after the placed tie wire has been tied, and stop means operable at the completion of the tensioning operation for locking the tensioning means whereby when the tie wire is cut further action of the tensioning means is prevented.

5. In a tying machine, a spring weighted tensioning means for pulling taut a placed tie wire, a first gripper carried by one portion of said tensioning means for gripping the free end of said wire, a second gripper spaced therefrom and carried by a second portion of the tensioning means for gripping the supply portion of the placed tie wire, severing means positioned between the said grippers and operable after the placed tie wire has been tied for severing the supply portion therefrom, and stop means operable at the completion of the tensioning operation for locking the tensioning means against further tensioning action.

6. In a tying machine, a spring weighted tensioning means for pulling taut a placed tie wire, a first gripper carried by one portion of said tensioning means for gripping the free end of said wire, a second gripper spaced therefrom and carried by a second portion of the tensioning means for gripping the supply portion of the wire, severing means positioned between the said grippers and operable after the placed wire has been tied for severing the supply portion therefrom, stop means operable at the completion of the tensioning operation for locking said tensioning means against further tensioning action, and a threading device arranged to take hold of the wire between the severing and second gripping means and operable upon the completion of the severing operation for presenting the cut end of the supply wire to the first gripper.

7. In a tying machine, a spring weighted tensioning means for pulling taut a placed tie wire, a first gripper carried by one portion of the tensioning means for gripping the free end of said wire, a second gripper spaced therefrom and carried by a second portion of the tensioning means for gripping the wire, severing means operable after the placed wire has been tied for severing the supply portion therefrom, stop means operable at the completion of the tensioning operation for locking said tensioning means against further tensioning action, a threading device arranged to take hold of the supply portion of the wire and operable upon the completion of the severing operation for presenting the cut end of the supply wire to the first gripper, and gripper actuating means for causing the grippers to open during the threading operation and for causing the first gripper to close upon the presented wire end.

8. In a tying machine, a spring weighted tensioning means for pulling taut a placed tie wire, a first gripper carried by one portion of the tensioning means for gripping the free end of said wire, a second gripper spaced therefrom and carried by a second portion of the tensioning means for gripping the supply portion of the tie wire, severing means operable after the placed wire has been tied for severing the supply portion therefrom, stop means operable at the completion of the tensioning operation for locking said tensioning means against further tensioning action, a threading device arranged to take hold of the supply portion of the wire and operable upon the completion of the severing operation for presenting the cut end of the supply wire to the first gripper, gripper actuating means for causing the grippers to open during the threading, and means carried by the threading device for causing the first gripper to close upon the wire end presented thereto.

9. In a tying machine having article supporting, tying, gripping and normally retracted separator means arranged so that those portions of a placed tie wire which extend from the corners of an article to the grippers will cross in the tying means; clamping means operatively mounted in the machine in spaced relation to the tying means, and means for actuating the clamping means for lifting the related article encircling portions of the tie wire substantially into engagement with the adjacent side of the article whereby the article encircling and gripped portions of the tie wire will be spread to insure accurate entry of the separator means between said wire portions.

10. In a tying machine having article supporting, gripping and spaced separator means arranged so that those portions of a placed tie wire which extend from the corners of an article to the grippers will cross substantially intermediate said separators; clamping means operatively mounted in the machine in spaced relation to the separator means, means for actuating the clamping means for lifting the article encircling portions of the tie wire substantially into engagement with the adjacent side of the article, and means operable for thereafter projecting the separator means between the spread wire portions.

11. In a wire tying machine, means for gripping the free end of a tie wire, severing means spaced from said gripper, a threading device arranged to take hold of the supply portion of the tie wire adjacent the severing means and to present the cut end of the wire to the gripper.

12. In a wire tying machine, means for gripping the free end of a tie wire presented thereto, tie wire severing means, and a threading device arranged to take hold of the supply portion of the tie wire and operable upon completion of the severing operation for presenting the newly cut end of the supply wire to said gripping means.

HERBERT HARVEY.